United States Patent Office 3,488,109
Patented Jan. 6, 1970

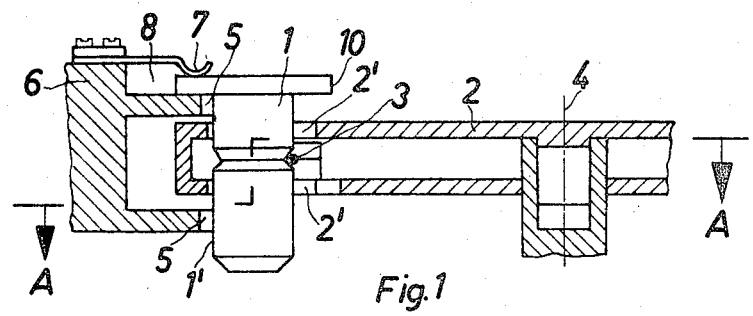
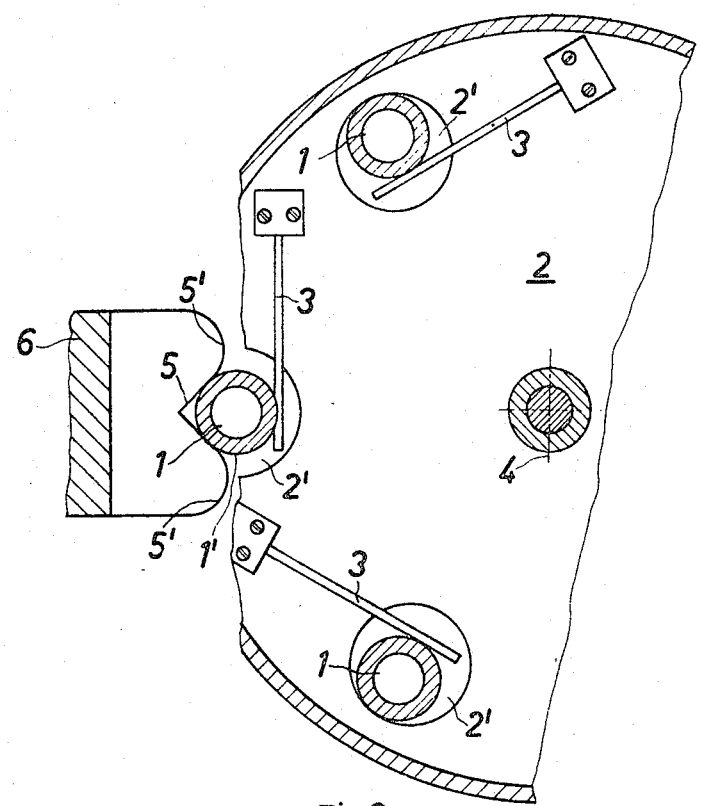

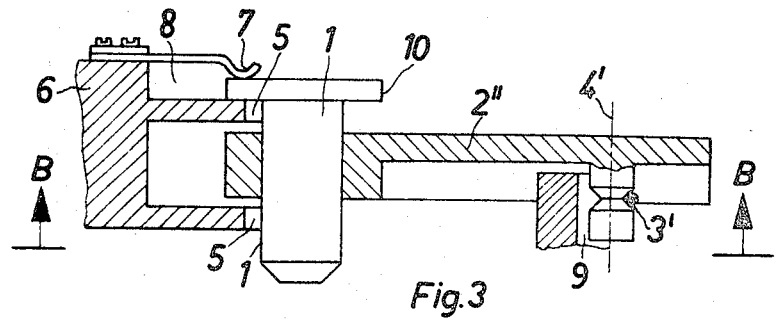
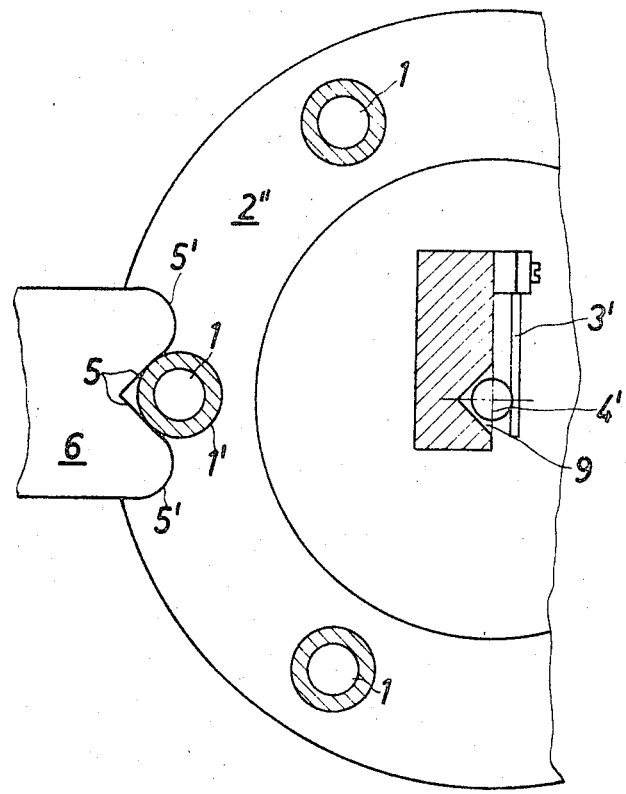

3,488,109
OBJECTIVE CHANGING DEVICES
Horst Sperlich, Frauenwald, Suhl, Germany, assignor to VEB Carl Zeiss Jena, Jena, Gera, Germany
Filed Apr. 17, 1967, Ser. No. 678,463
Int. Cl. G02b 7/02, 7/04, 15/02
U.S. Cl. 350—254
2 Claims

ABSTRACT OF THE DISCLOSURE

A device for changing objectives in an optical instrument has conveying means with a plurality of objectives mounted movably in relation to the conveying means; two angularly disposed surfaces serve to align the optical axis of one of the objectives with the optical axis of the instrument; a face, being substantially normal to said surfaces, serves to hold said one of the objectives in operating distance from the instrument.

---

This invention relates to an objective changing device for optical instruments, particularly microscopes, which comprises a conveyer mechanism holding exchangeable objectives and which makes it possible so to insert one of a plurality of previously selected objectives into the imaging ray path of the optical instrument that slight admissible tolerances in the position of the objective cannot be exceeded.

Objective changing devices for microscopes are known in which the objectives are secured to a conveyer mechanism and in which the desired objective by an appropriate motion of this mechanism can be inserted into the imaging ray path. Perfect alignment with this ray path is not however possible because of inaccuracies in the guiding and click-stop elements of the conveyor mechanism and inaccuracies in the attachment of the objectives to this mechanism.

It is an object of the present invention to overcome the foregoing disadvantage by making the errors in the position of the objective in the imaging ray path independent of the conveyer mechanism.

To this end the present invention accordingly consists in an objective changing device of the kind hereinbefore set forth, wherein the storage and conveyance of the objectives is separate from the means securing the position of the desired objective in the imaging ray path, so that this objective subsequent to conveyance can be accurately set by a stationary take-up means aligning the optical axis of the objective with that of the optical instrument.

According to a feature of the invention, the objectives or parts thereof are displaceable with play relatively to the conveyer mechanism holding them, or this mechanism or parts thereof are displaceable with play relatively to the optical instrument so that the final location of the selected objective and its exact alignment with the optical axis of the instrument is achieved by said stationary take-up means.

In order that the invention may be more readily understood, reference will now be made to the accompanying drawings, which illustrate diagrammatically and by way of example two embodiments of the invention and in which FIG. 1 shows the one embodiment, FIG. 2 shows a section through AA in FIG. 1,
FIG. 3 shows the other embodiment, and
FIG. 4 shows a section through BB in FIG. 3.

In FIGS. 1 and 2, objectives 1 rest in a conveyor disc 2. Springs 3 prevent the objectives 1 from falling out in the direction of their axes and urge them radially outward.

By rotation of the disc 2 about its axis 4, any desired objective 1 can be put in aligning contact with the angularly disposed surfaces of a prism 5 of a take-up means 6 being fast with the microscope (not shown).

As best seen in FIG. 1 an annular flange 10, disposed on one end of the objective, abuts against face 8 being forced against said face by spring 7. Thus the objective is aligned with the optical axis of the instrument and at the same time held in operating distance therefrom. At their open ends the angularly disposed surfaces of the prism 5 have rounded off portions 5' which guide the objective 1 into its operating position between the surfaces when the conveyor disc 2 is rotated about its axis 4.

In the embodiment shown in FIGS. 3 and 4, the objectives 1 rest in a conveyer disc 2', which is held with play by a guide 9. A spring 3' acting at right angles to the spindle 4' urges the disc 2' towards the angularly disposed surfaces of prism 5, where the desired objective 1 is fixed by the same means and in the same manner as described with reference to FIGS. 1 and 2.

The objective, as seen in FIG. 3, has an annular flange 10. The objective is mounted in the conveyor disc 2" for rotatable movement therewith. The conveyor disc 2" is rotatable about axis 4' which is urged by spring 3' in the direction of the angularly disposed surfaces of prism 5. At their open ends the surfaces 5 have rounded off portions 5' which guide the objective 1 into its operating position between the surfaces 5, when said conveyor disc is rotated about its axis.

I claim:

1. In an optical instrument, specifically in a microscope, an objective changing device comprising a plurality of objectives each having an axis and a cylindrical surface; conveying means receiving said objectives for selectively moving one of said objectives into and out of its operating position, said objectives being mounted on said conveying means movably in relation therewith; aligning means having at least two angularly disposed surfaces and a face substantially normal to said surfaces, said two surfaces receiving therebetween said cylindrical surface of the objective in operating position; a first spring means urging the cylindrical surface of said movably mounted objective against the two angularly disposed surfaces for alignment of the axis of said objective with the optical axis of the instrument; and a second spring means urging said movably mounted objective into abutment with said face for holding said objective in operating distance in relation to said instrument.

2. In an optical instrument, having an optical axis, specifically in a microscope, an objective changing device, comprising a plurality of interchangeable objectives each having an axis, a cylindrical surface and an annular flange on one of its ends; conveying means receiving said objectives for selectively moving one of said objectives into and out of its operating position, a spindle for holding said conveying means; said conveying means being mounted rotatably on said spindle and being radially and axially displaceable in relation to said instrument; aligning means having at least two angularly disposed surfaces and a face substantially normal to said surfaces, said two surfaces receiving therebetween said cylindrical surface of the objective in operating position; a first spring means urging a radial displacement of said conveying means in relation to said instrument thereby bringing into contact said cylindrical surface with said two angularly disposed surfaces for aligning the optical axis of said instrument with the axis of said objective in operating position; and second spring means urging an axial displacement of said objective in operating position in relation to said instrument thereby bringing said annular flange into abutment with said face for holding said objective in operating distance in relation to said instrument.

References Cited

UNITED STATES PATENTS 2,656,759  10/1953  Bowerman _____ 350—254

FOREIGN PATENTS 849,186  9/1952  Germany.

DAVID SCHONBERG, Primary Examiner

ROBERT L. SHERMAN, Assistant Examiner

U.S. Cl. X.R.

350—39